No. 712,281. Patented Oct. 28, 1902.
H. G. FARR.
DEVICE FOR LESSENING THE NOISE OF VIBRATION IN VEHICLES.
(Application filed Feb. 14, 1902.)
(No Model.)

UNITED STATES PATENT OFFICE.

HIRAM G. FARR, OF WINCHESTER, MASSACHUSETTS.

DEVICE FOR LESSENING THE NOISE OF VIBRATION IN VEHICLES.

SPECIFICATION forming part of Letters Patent No. 712,281, dated October 28, 1902.

Application filed February 14, 1902. Serial No. 94,079. (No model.)

*To all whom it may concern:*

Be it known that I, HIRAM G. FARR, of Winchester, in the county of Middlesex and Commonwealth of Massachusetts, have invented certain new and useful Improvements in Devices for Lessening the Noise of Vibration in Vehicles, of which the following is a description sufficiently full, clear, and exact to enable any person skilled in the art or science to which said invention appertains to make and use the same, reference being had to the accompanying drawings, forming a part of this specification, in which—

Figure 1:
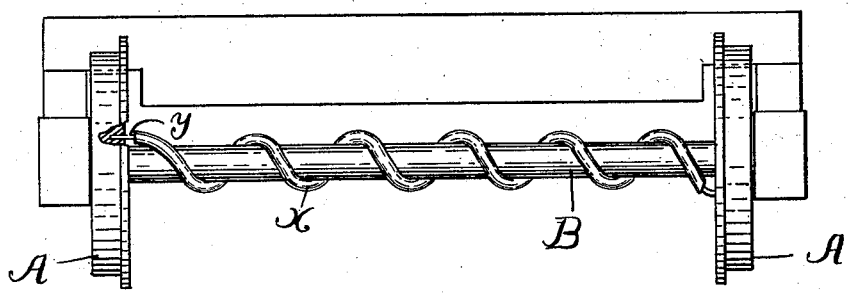
Figure 2:
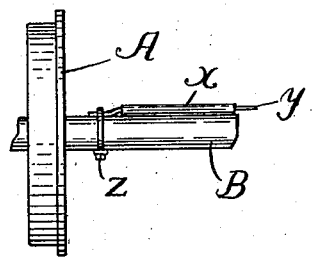

Figure 1 is an elevation showing wheels and axle and a portion of the structure of a motor-car with my device attached, and Fig. 2 an elevation illustrating a modification.

Like letters of reference indicate corresponding parts in the different figures of the drawings.

My invention relates especially to a device whereby the noise resulting from vibration set up in the wheels, axles, and other portions of the structure of a car by the contact of the wheels with the rails or by the action of the motor may be deadened or decreased to such degree as to not be objectionable.

I show herein my improvement applied to a railway-car for the purpose of illustrating; but I do not confine myself to this, as the device is applicable to any vehicle.

The nature and operation of the improvement will be understood by those conversant with such matters from the following explanation.

In the drawings, A A represent the truck-wheels, and B the axle.

My device consists, primarily, in connecting two parts of any portion of the vehicle which is subject particularly to vibration by a copper wire of gage graduated to the size of such parts. The bare ends of this wire are rigidly connected to such parts, and the remainder of body portion of said wire is covered with rubber, felt, or any well-known non-vibratory material. In Fig. 1 the bared ends $y$ of the wire are driven rigidly into suitable openings in the webs of the wheels A A, respectively, and the body of said wire, covered by non-vibratory material $x$, is coiled around the axle B. Vibration set up in the wheels A by impact with the rail-joints is imparted to the wire rigidly connected to said wheels, but is at once killed or neutralized by the covering $x$, and thus the sound resulting is to a very material degree overcome. Moreover, this device by thus lessening, stopping, or partially killing the vibration prevents it from being imparted to the axle B in marked degree. The danger of crystallization and subsequent breaking of the axle therefrom is decreased. As is well known, car-axles ordinarily crystallize and break at the center, because the vibrations are imparted simultaneously by the wheels at both ends. By breaking this as described the axle has far greater life than is usual.

In Fig. 2 I show the bared end of the wire $x$ secured in contact with the axle adjacent the wheel by means of a clamp $z$, it being impracticable to bore into said axle.

Any means of securing the wire may be employed, and such device may be applied to various parts of the motor, brake mechanism, or car-body without departing from the scope of my invention.

Again, I find that by securing only one end of the wire to the vibrating parts and permitting the covered portion of said wire to hang loose or pendent I effect substantial results in this line, and although I prefer to rigidly secure both ends I do not wish to be confined to so doing.

Having thus described my invention, what I claim is—

1. A car-axle in combination with a wire having its bared ends rigidly secured to said axle adjacent opposite ends thereof respectively, the body of said wire being covered by a non-vibratory material.

2. A car axle and wheels in combination with a wire having its bared ends rigidly connected respectively with said wheels, the body portion of said wire being covered by a non-vibratory material.

HIRAM G. FARR.

Witnesses:
O. M. SHAW,
C. M. WILBUR.